United States Patent
Luo et al.

(10) Patent No.: US 8,687,728 B2
(45) Date of Patent: Apr. 1, 2014

(54) CUBIC-METRIC BASED FREQUENCY SELECTIVE PRECODING FOR UPLINK IN MIMO COMMUNICATION SYSTEM

(75) Inventors: Xiliang Luo, Northridge, CA (US); Peter Gaal, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 334 days.

(21) Appl. No.: 13/105,654

(22) Filed: May 11, 2011

(65) Prior Publication Data

US 2012/0114065 A1 May 10, 2012

Related U.S. Application Data

(60) Provisional application No. 61/334,528, filed on May 13, 2010.

(51) Int. Cl.
H04B 7/02 (2006.01)

(52) U.S. Cl.
USPC .......................................................... 375/267

(58) Field of Classification Search
CPC .................. H04L 5/0053; H04L 2025/03426; H04L 27/2601; H04L 1/0026; H04L 25/0242; H04L 5/0073; H04L 1/06; H04B 7/063; H04B 7/0691; H04B 7/0619; H04B 7/0639; H04B 7/0626; H04B 7/0413
USPC .......................................... 375/260, 267, 299
See application file for complete search history.

(56) References Cited

U.S. PATENT DOCUMENTS

| | | |
|---|---|---|
| 2006/0029157 A1 | 2/2006 | Dabak et al. |
| 2010/0034186 A1 | 2/2010 | Zhou et al. |
| 2010/0039928 A1* | 2/2010 | Noh et al. ..................... 370/210 |
| 2010/0067368 A1 | 3/2010 | Lee et al. |
| 2012/0219091 A1* | 8/2012 | Li et al. ......................... 375/296 |
| 2012/0250558 A1* | 10/2012 | Chung et al. ................... 370/252 |
| 2013/0129013 A1* | 5/2013 | Han et al. ...................... 375/295 |

FOREIGN PATENT DOCUMENTS

| | | |
|---|---|---|
| WO | WO2010048129 A1 | 4/2010 |
| WO | WO2010101374 A2 | 9/2010 |

OTHER PUBLICATIONS

Ericsson, "Uplink SU-MIMO in LTE-Advanced", 3GPP Draft, R1-092027, 3rd Generation Partnership Project (3GPP), Mobile Competence Centre, 650, Route Des Lucioles, F-06921 Sophia-Antipolis Cedex, France, No. San Francisco, USA, 20090428, Apr. 1-28, 2009, XP050339495.
International Search Report and Written Opinion—PCT/US2011/036475, ISA/EPO—Oct. 21, 2011.
"3rd Generation Partnership Project; Technical Specification Group Radio Access Network; Evolved Universal Terrestrial Radio Access (E-UTRA); Further advancements for E-UTRA physical layer aspects" (Release 9), 3GPP TR 36.814 V9.0.0 (Mar. 2010).

* cited by examiner

Primary Examiner — Don N Vo
(74) Attorney, Agent, or Firm — Dalei Dong

(57) ABSTRACT

A method of wireless communication is disclosed which includes acquiring a first set of precoding matrices for a set of frequency bands and generating a second set of precoding matrices for the set of frequency bands based on the first set of precoding matrices. The second set of precoding matrices enables a transmission that satisfies a cubic metric criteria in multiple-in multiple-out communication mode in the uplink. In some designs, generating the second set of precoding matrices can be based on restricting the first set of precoding matrices for a set of frequency bands and transmission rank, rotating the first set of precoding matrices based for a predetermined transmission rank, or a combination thereof.

50 Claims, 9 Drawing Sheets

FIG. 7

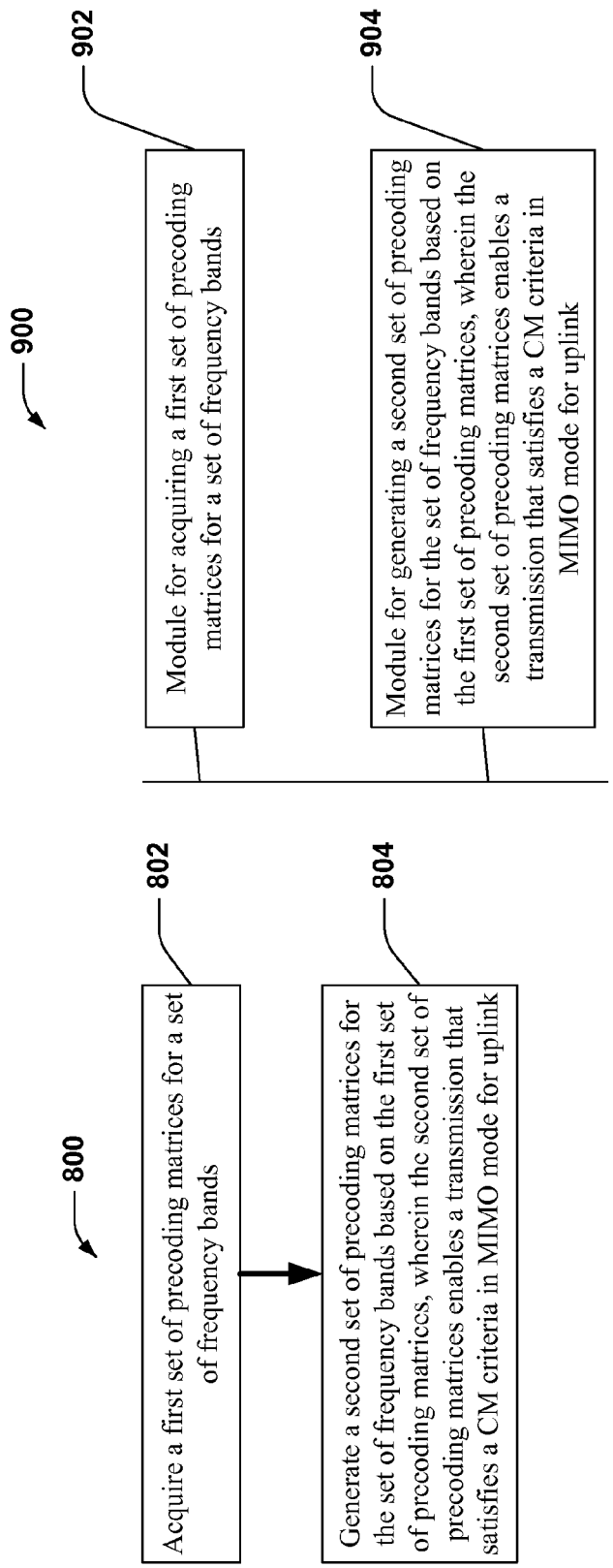

CUBIC-METRIC BASED FREQUENCY SELECTIVE PRECODING FOR UPLINK IN MIMO COMMUNICATION SYSTEM

CROSS-REFERENCE TO RELATED APPLICATIONS

This application claims the benefit of priority from U.S. Provisional Patent Application Ser. No. 61/334,528, entitled "LOW CUBIC-METRIC FREQUENCY SELECTIVE PRE-CODING FOR UPLINK IN ADVANCED TELECOMMUNICATION NETWORKS," filed on May 13, 2010, which is herein incorporated by reference in its entirety.

BACKGROUND

I. Field

The following description relates generally to wireless communication systems, and more particularly, but not exclusively, to frequency selective precoding that satisfies a cubic metric (CM) criteria for uplink (UL) telecommunication in an advanced telecommunication network that supports multiple-in-multiple-out (MIMO) communication in the UL.

II. Relevant Background

Wireless communication systems are widely deployed to provide various types of communication content such as voice, data, and so forth. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, Long Term Evolution (LTE) systems including E-UTRA, and orthogonal frequency division multiple access (OFDMA) systems.

An orthogonal frequency division multiplex (OFDM) communication system effectively partitions the overall system bandwidth into multiple subcarriers, which may also be referred to as frequency sub-channels, tones, or frequency bins. For an OFDM system, the data to be transmitted (i.e., the information bits) is first encoded with a particular coding scheme to generate coded bits, and the coded bits are further grouped into multi-bit symbols that are then mapped to modulation symbols. Each modulation symbol corresponds to a point in a signal constellation defined by a particular modulation scheme (e.g., M-PSK or M-QAM) used for data transmission. At each time interval that may be dependent on the bandwidth of each frequency subcarrier, a modulation symbol may be transmitted on each of the frequency subcarriers. Thus, OFDM may be used to combat inter-symbol interference (ISI) caused by frequency selective fading, which is characterized by different amounts of attenuation across the system bandwidth.

Generally, a wireless multiple-access communication system can concurrently support communication for multiple terminals that communicate with one or more base stations via transmissions on downlink and uplink. As indicated supra, the downlink refers to the communication link from the base stations to the terminals, and the uplink refers to the communication link from the terminals to the base stations. This communication link may be established via a single-in-single-out (SISO), single-in multiple-out (SIMO), multiple-in-single-out (MISO) or a multiple-in-multiple-out (MIMO) system.

A MIMO system employs multiple (NT) transmit antennas and multiple (NR) receive antennas for data transmission. A MIMO channel formed by the NT transmit and NR receive antennas may be decomposed into NS independent channels, which are also referred to as spatial channels. Generally, each of the NS independent channels corresponds to a dimension. The MIMO system can provide improved performance (e.g., higher throughput and/or greater reliability) if the additional dimensionalities created by the multiple transmit and receive antennas are utilized. A MIMO system also supports time division duplex (TDD) and frequency division duplex (FDD) systems. In a TDD system, the downlink and uplink transmissions are on the same frequency region so that the reciprocity principle allows estimation of the downlink channel from the uplink channel. This enables an access point to extract transmit beam-forming gain on the uplink when multiple antennas are available at the access point.

Development of mobile wireless networks, or telecommunication networks, has been directed primarily to improving various aspects of network performance (e.g., data rates, network latency, control overhead, resource utilization, etc.) within an allocated bandwidth in order to offer subscribers a better experience and ensuing perceived quality of service when utilizing applications which demand high data throughputs. In communication systems (e.g., LTE Advanced (Release 10)), uplink (UL) spatial multiplexing of up to four layers is supported with wide-band precoding (e.g., application of a single precoding matrix per UL component carrier). In wide-band precoding, single-carrier waveform can be maintained at each antenna in a set of antennas in a user equipment (UE) and, generally, a single precoding matrix indicator (PMI) is signaled.

Advanced telecommunication networks can allow MIMO communication in the UL to attain higher data rates and increase overall network performance; however, spatial multiplexing in conventional communication typically preserves the cubic metric (CM) of single-carrier waveform and thus the CM of the transmitted waveform at each antenna in the set of antennas in the UE is the same as SIMO transmission rather than specific to MIMO communication in the UL. In addition, for frequency-selective precoding (e.g., application of different precoding matrices in different frequency bands of an UL component carrier), the transmitted waveform from one transmit antenna in the set of antennas in the UE may no longer be single-carrier waveform and thus the transmitted waveform may exhibit high cubic metric.

SUMMARY

The systems and methods provided in this disclosure meet the above discussed needs, and others. Briefly and in general terms, the disclosed designs, in one aspect, perform techniques for generating frequency-selective precoding matrices that enable transmission in the uplink that satisfies a cubic metric criteria, such as a low cubic metric transmission. The frequency-selective precoding matrices can be established for frequency bands that span one or more physical resource blocks (PRBs) in frequency domain.

In one aspect, a method for wireless communication includes acquiring a first set of precoding matrices for a set of frequency bands, and generating a second set of precoding matrices for the set of frequency bands based on the first set of precoding matrices. The second set of precoding matrices enables a transmission that satisfies a cubic metric criteria in multiple-in multiple-out communication mode in uplink.

In yet another aspect, a communications apparatus includes means for acquiring a first set of precoding matrices for a set of frequency bands, and means for generating a second set of precoding matrices for the set of frequency bands based on the first set of precoding matrices. The second set of precoding matrices enables a transmission that satisfies a cubic metric criteria in multiple-in multiple-out communication mode in uplink.

In yet another aspect, a computer program product including a computer-readable medium storing computer-executable instructions is disclosed. The instructions include instructions for causing at least one processor to acquire a first set of precoding matrices for a set of frequency bands, and instructions for causing the at least one processor to generate a second set of precoding matrices for the set of frequency bands based on the first set of precoding matrices. The second set of precoding matrices enables a transmission that satisfies a cubic metric criteria in multiple-in multiple-out communication mode in UL.

In yet another aspect, an apparatus for wireless communication includes at least one processor configured to acquire a first set of precoding matrices for a set of frequency bands, and to generate a second set of precoding matrices for the set of frequency bands based on the first set of precoding matrices. The second set of precoding matrices enables a transmission that satisfies a cubic metric criteria in multiple-in multiple-out communication mode in uplink.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein:

FIG. 7 illustrates groups of precoding matrices.

FIG. 8 is a flow chart of a process for wireless communication.

FIG. 9 is a block diagram of a portion of a wireless communication apparatus.

DESCRIPTION

Figure 1:
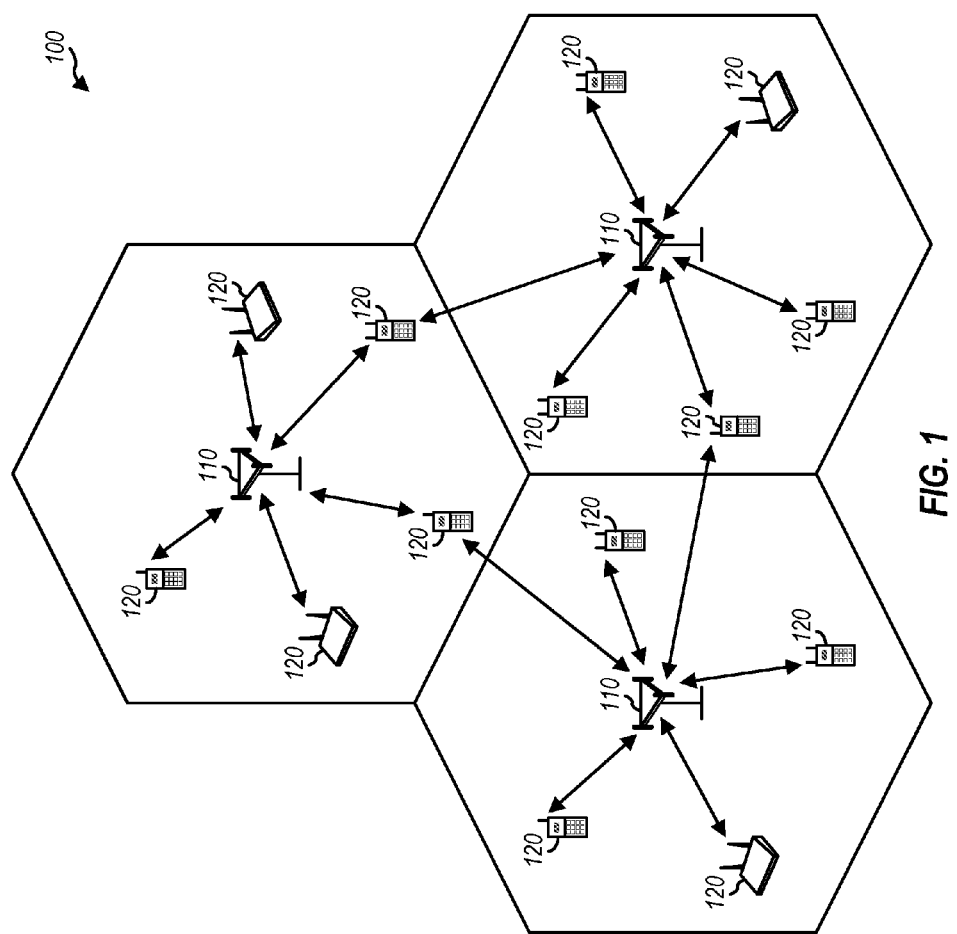
FIG. 1 illustrates a multiple access wireless communication system according to one embodiment.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2).

For clarity, certain aspects of the techniques are described below for LTE, and LTE terminology is used in much of the description below. However, the various aspects described herein can be implemented in other telecommunication networks, and associated radio technology protocol(s), that allow MIMO communication in the UL, such as LTE Advanced (LTE-A).

Single carrier frequency division multiple access (SC-FDMA) utilizes single carrier modulation and frequency domain equalization. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently used for uplink multiple access scheme in LTE. There may also be other waveforms with low PAPR, such as clustered SC-FDMA signals, CDMA signals with certain code channel configurations, OFDMA signals after applying certain PAPR reduction techniques, or generally any low PAPR signal. For illustrative purposes the systems and methods described herein reference SC-FDMA signals, however the systems and methods apply equally to any other low PAPR signals.

It should be noted that for clarity, the subject matter below is discussed with respect to specific examples of certain signals and message formats used in LTE. However, the applicability of the disclosed techniques to other communication systems and other signal transmission/reception technology will be appreciated by one of skill in the art.

FIG. 1 shows an exemplary wireless communication system 100, which may be an LTE system or some other system. The system 100 may utilize cubic metric (CM) based generation of frequency-selective precoding matrices in UL in MIMO communication mode, such as generation of frequency-selective precoding matrices that enable low-CM transmission, in accordance with aspects described herein. System 100 may include a number of base stations 110 and other network entities. The base station 110 may be an entity that communicates with the user equipments (UEs) 120 and may also be referred to as a Node B, an evolved Node B (eNB), an access point, etc. Each base station 110 may provide communication coverage for a particular geographic area and may support communication for the UEs 120 located within the coverage area. To improve capacity, the overall coverage area of a base station may be partitioned into multiple (e.g., three) smaller areas. Each smaller area may be served by a respective eNB subsystem. In 3GPP, the term "cell" can refer to the smallest coverage area of an base station 110 and/or an eNB subsystem serving this coverage area.

UEs 120 may be dispersed throughout the system, and each UE 120 may be stationary or mobile. A UE may also be referred to as a mobile station, a mobile device, a terminal, an access terminal, a subscriber unit, etc. A UE 120 may be a cellular phone, a personal digital assistant (PDA), a wireless modem, a wireless communication device, a handheld device, a laptop computer, a wireless local loop (WLL) station, a smart phone, a netbook, a smartbook, a tablet, etc.

LTE utilizes OFDM on the downlink and SC-FDM on the uplink. OFDM and SC-FDM partition a frequency range into multiple ($K_s$) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers ($K_s$) may be dependent on the system bandwidth. For example, $K_s$ may be equal to 128, 256, 512, 1024 or 2048 for system bandwidth of 1.4, 3, 5, 10 or 20 MHz, respectively. The system bandwidth may correspond to a subset of the $K_s$ total subcarriers.

Figure 2:
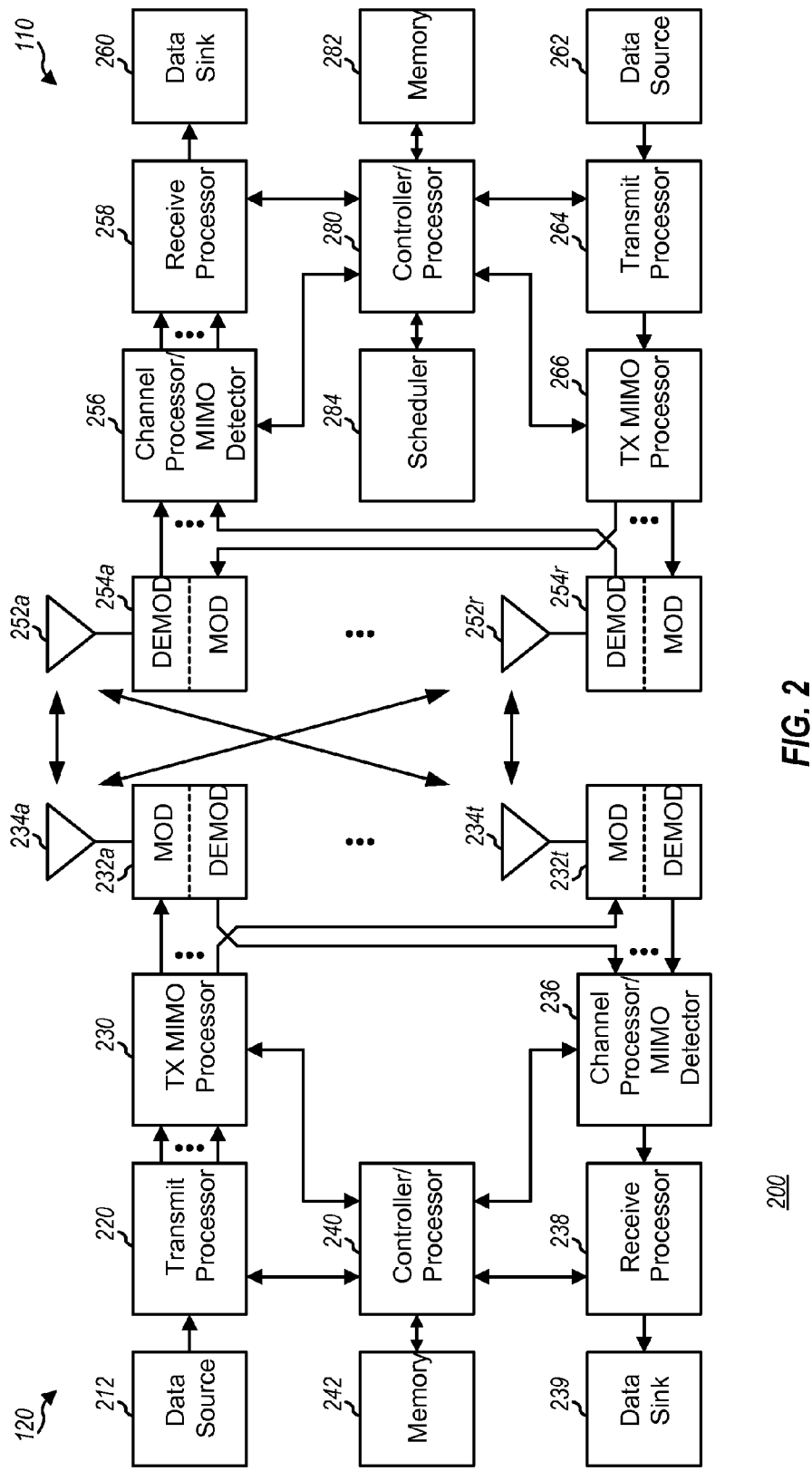
FIG. 2 illustrates a block diagram of a communication system.

FIG. 2 shows a block diagram of an exemplary base station 110 and UE 120, which may be one of the base stations and one of the UEs in FIG. 1. A UE 120 may be equipped with T antennas 234a through 234t, and base station 110 may be equipped with R antennas 252a through 252r, where in general T≥1 and R≥1.

At UE 120, a transmit processor 220 may receive data from a data source 212 and control information from a controller/processor 240. Transmit processor 220 may process (e.g., encode, interleave, and symbol map) the data and control information and may provide data symbols and control symbols, respectively. Transmit processor 220 may also generate one or more demodulation reference signals for multiple non-contiguous clusters based on one or more RS sequences assigned to UE 120 and may provide reference symbols. A transmit (TX) multiple-input multiple-output (MIMO) processor 230 may perform spatial processing (e.g., precoding) on the data symbols, the control symbols, and/or the reference symbols from transmit processor 220, if applicable, and may provide T output symbol streams to T modulators (MODs) 232a through 232t. Each modulator 232 may process a respective output symbol stream (e.g., for SC-FDMA, OFDM, etc.) to obtain an output sample stream. Each modulator 232 may further process (e.g., convert to analog, amplify, filter, and upconvert) the output sample stream to obtain an uplink signal. T uplink signals from modulators 232a through 232t may be transmitted via T antennas 234a through 234t, respectively.

At base station 110, antennas 252a through 252r may receive the uplink signals from UE 120 and provide received signals to demodulators (DEMODs) 254a through 254r, respectively. Each demodulator 254 may condition (e.g., filter, amplify, downconvert, and digitize) a respective received signal to obtain received samples. Each demodulator 254 may further process the received samples to obtain received symbols. A channel processor/MIMO detector 256 may obtain received symbols from all R demodulators 254a through 254r. Channel processor 256 may derive a channel estimate for a wireless channel from UE 120 to base station 110 based on the demodulation reference signals received from UE 120. MIMO detector 256 may perform MIMO detection/demodulation on the received symbols based on the channel estimate and may provide detected symbols. A receive processor 258 may process (e.g., symbol demap, deinterleave, and decode) the detected symbols, provide decoded data to a data sink 260, and provide decoded control information to a controller/processor 280.

On the downlink, at base station 110, data from a data source 262 and control information from controller/processor 280 may be processed by a transmit processor 264, precoded by a TX MIMO processor 266 if applicable, conditioned by modulators 254a through 254r, and transmitted to UE 120. At UE 120, the downlink signals from base station 110 may be received by antennas 234, conditioned by demodulators 232, processed by a channel estimator/MIMO detector 236, and further processed by a receive processor 238 to obtain the data and control information sent to UE 120. Processor 238 may provide the decoded data to a data sink 239 and the decoded control information to controller/processor 240.

Controllers/processors 240 and 280 may direct the operation at UE 120 and base station 110, respectively. Processor 220, processor 240, and/or other processors and modules at UE 120 may perform or direct process 800 in FIG. 8, and/or other processes for the techniques described herein. Memories 242 and 282 may store data and program codes for UE 120 and base station 110, respectively. A scheduler 284 may schedule UEs for downlink and/or uplink transmission and may provide allocations of resources (e.g., assignment of multiple non-contiguous clusters, RS sequences for demodulation reference signals, etc.) for the scheduled UEs.

Advances in digital communication have led to the use of multiple transmission antennas on UE 120. For example, in LTE Release 10, a single user MIMO (SU-MIMO) mode is defined, in which, a UE 120 may transmit up to two transport blocks (TBs) to the base station 110. TBs are also sometimes called codewords (CWs), although sometimes the mapping from TBs to CWs may follow a permutation, such as swapping two TBs mapped to a pair of CWs.

Figure 3:
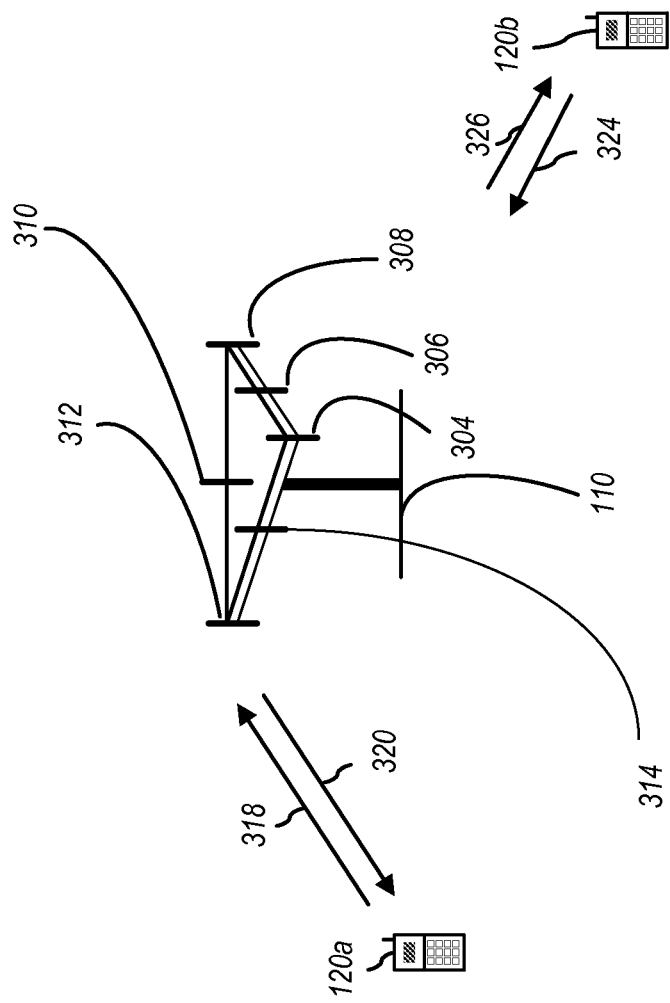
FIG. 3 illustrates a diagram of a communication system.

FIG. 3 shows a diagram of an exemplary base station 110 and UEs 120a-b, which may be one of the base stations and one of the UEs in FIGS. 1-2. The base station 110 may include multiple antenna groups, such as one including 304 and 306, another including 308 and 310, and an additional including 312 and 314. In FIG. 3, only two antennas are shown for each antenna group, however, more or fewer antennas may be utilized for each antenna group. UE 120a is in communication with antennas 312 and 314, where antennas 312 and 314 transmit information to UE 120a over uplink 320 and receive information from UE 120a over uplink 318. UE 120b is in communication with antennas 306 and 308, where antennas 306 and 308 transmit information to UE 120b over downlink 326 and receive information from UE 120b over uplink 324. In a FDD system, communication links 318, 320, 324 and 326 may use different frequency for communication. For example, downlink 320 may use a different frequency then that used by uplink 318.

Each group of antennas and/or the area in which they are designed to communicate is often referred to as a sector of the base station 110. Antenna groups each are designed to communicate to UEs in a sector, of the areas covered by base station 110. In communication over uplink 320 and uplink 326, the transmitting antennas of base station 110 utilize beam-forming in order to improve the signal-to-noise ratio of downlinks for the different UEs 120a-b. Also, a base station using beam-forming to transmit to UEs scattered randomly through its coverage may cause less interference to access terminals in neighboring cells than a base station transmitting through a single antenna to all its UEs.

Figure 4:
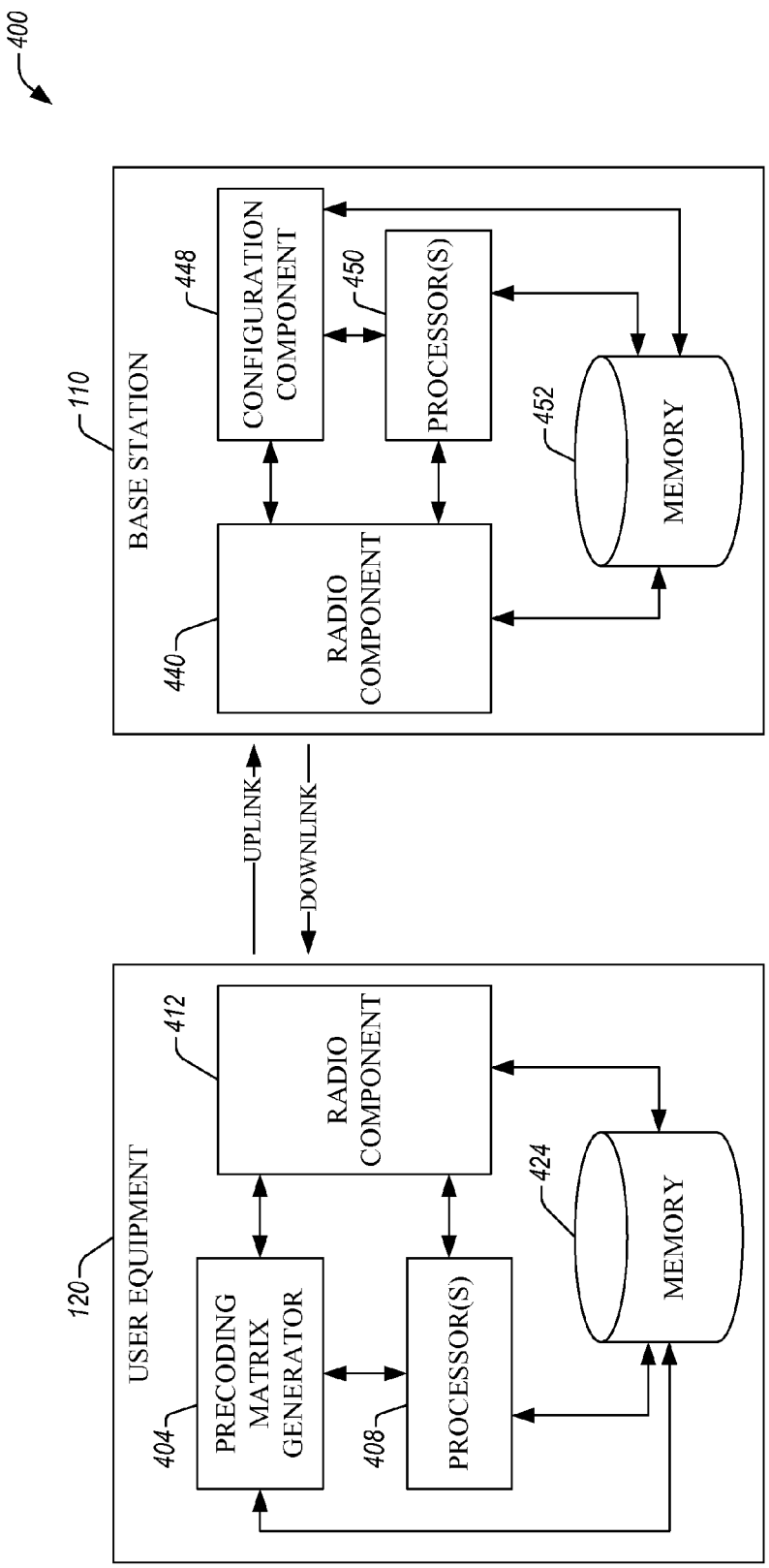
FIG. 4 illustrates a communication system that enables cubic metric based generation of frequency-selective precoding matrices in uplink.

FIG. 4 shows a block diagram of an exemplary system 400 that enables CM based generation of frequency-selective precoding matrices in UL in MIMO communication mode, such as generation of frequency-selective precoding matrices for low-CM transmission, in accordance with various aspects of the subject disclosure. In system 400, an exemplary base station 110 and UE 120, may be one of the base stations and one of the UEs in FIGS. 1-3.

UE 120 may include a precoding matrix generator component 404, also referred to as precoding matrix generator 404, one or more processor(s) 408, a radio component 412, and memory 424. Precoding matrix generator 404 may produce a set of precoding matrices for a group of frequency bands in accordance with aspects described herein. Base station 110 may include a radio component 440, a configuration component 448, a processor 450, and memory 452. UE 120 may communicate (e.g., exchange data and signaling) with base station 110 through wireless uplink and downlink via the radio component 412, as described in more detail in FIG. 3 above.

The set of precoding matrices can be produced in accordance with various modes described herein. In frequency-selective precoding, a precoding matrix $W_\gamma$ (with $\gamma \geq 0$) can be specific to a frequency band $B_\gamma$, with different precoding matrices selected differently, or substantially the same, for disparate frequency bands. In an aspect, a frequency band $B_\gamma$ can span the carriers in a single physical resource block (PRB) or the carriers in a cluster of PRBs.

In an aspect, UE 120 in system 400 includes a memory 424 which can be a computer-readable storage medium that retains code instructions that, when executed by processor(s) 408, implement the functionality of UE 120 in connection with generation of frequency-selective precoding matrices that satisfy a cubic metric criteria, such as low-CM transmission in UL in MIMO communication. It should be appreciated that in one or more embodiments, precoding matrix generator 404 and at least a portion of radio component 412 can reside within memory 424 as one or more sets of code instructions; in such one or more embodiments, functionality of precoding matrix generator 404 or at least the portion of radio component 412 can be implemented when processor(s) 408 execute the one or more set of code instructions. In additional or alternative embodiments, processor(s) 408 can be distributed as part of precoding matrix generator 404, or component(s) therein, or radio component 412, or component(s) therein.

In another aspect, base station 110 in example system 400 includes a memory 452 which can be a computer-readable storage medium that retains code instructions that, when executed by processor(s) 450, implement the functionality of base station 110 in connection with frequency-selective precoding for satisfying a cubic metric criteria, such as low-CM transmission in UL in MIMO communication mode. It should be appreciated that in one or more embodiments, configuration component 448 and at least a portion of radio component 440 can reside within memory 452 as one or more sets of code instructions; in such one or more embodiments, functionality of configuration component 448 or at least the portion of radio component 440 is implemented when processor(s) 450 execute the one or more set of code instructions. In additional or alternative embodiments, processor(s) 450 can be distributed as part of configuration component 448, or component(s) therein, or radio component 440, or component(s) therein.

It should be appreciated that the various components that are part of the base station 110 and UE 120 can exchange data via several communication protocols and related architecture, such as a bus architecture (address bus, message bus, etc.; illustrated with arrows in FIG. 4).

Figure 5:
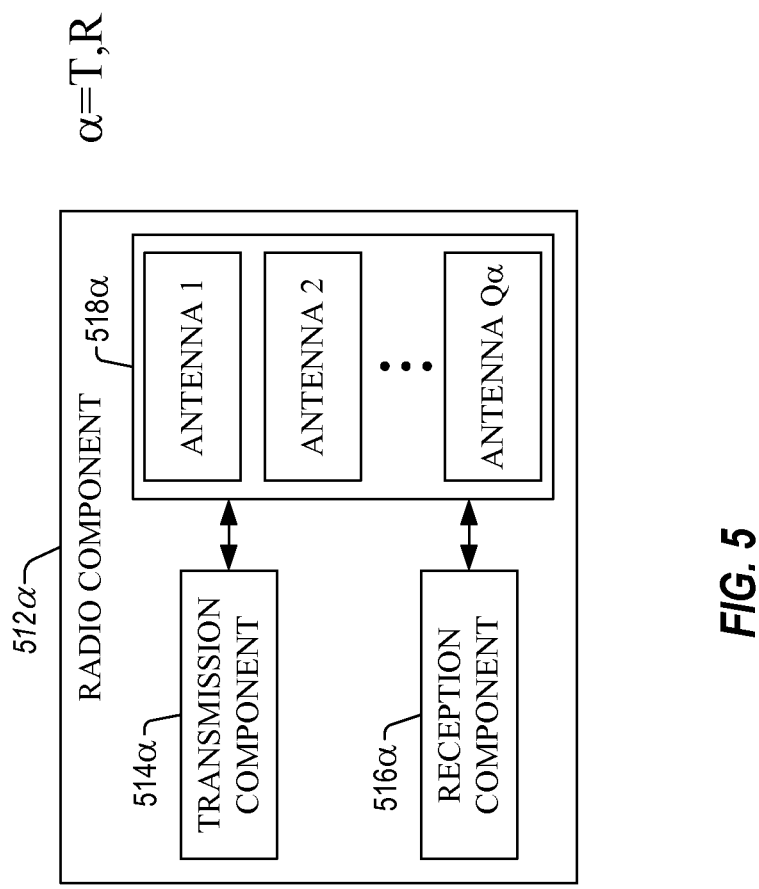
FIG. 5 illustrates a block diagram of a radio component of a user equipment in a communication system.

FIG. 5 shows a block diagram of an exemplary radio component 512, which may correspond to a radio component 412 of a UE 120 where α=T, such as one of the UEs in FIG. 1, or a radio component 440 of a base station 110 where α=R, such as one of the base stations in FIG. 1.

In an embodiment where α=T, i.e. the radio component 512 corresponds to the radio component 412 of a UE 120, the radio component 512T may include a transmission (T) component 514T that can deliver data and signaling to base station 110 and a reception component 516T that can receive data and signaling from base station 110. For example, radio component 512T may receive a generation mode configuration indication that conveys a mode to be employed for generation of frequency-selective precoding matrices in accordance with aspects described hereinafter. The generation mode configuration (not shown) can be stored in memory 424, e.g., in a register that can contain one or more bits that convey a particular implementation of generation of frequency-selective precoding matrices. UE 120 may be an access terminal (also referred to as terminal, access terminal, mobile station, or mobile device). In an embodiment, radio component 512 may include multiple antennas, e.g., antenna 1, antenna 2 . . . , antenna Qa (with Q a natural number greater to equal than unity, and α=T a parameter that indicates the radio component 512 is part of a UE) that enable, at least in part, MIMO communication in the UL. Likewise, for an embodiment where α=R, i.e. the radio component 512 corresponds to the radio component 440 of a base station 110, the radio component 512 may include a plurality of antennas 518R, reception component 516R and transmission component 514R can enable MIMO communication from base station 110 towards UE 120.

In an embodiment, precoding matrix generator 404 can acquire (select, determine, retrieve, receive, etc.) a first set of precoding matrices and can generate a second set of precoding matrices trough precoding matrix restriction of the first set of precoding matrices. The second set of precoding matrices enable MIMO transmission in the UL that satisfies a cubic metric (CM) criteria, such as MIMO transmission in the UL with low CM waveform from antenna(s) with less powerful power amplifier(s) PA(s), with more powerful PA(s) can transmit at higher CM. The precoding matrices in the first set of precoding matrices are frequency-selective, and so are the precoding matrices in the second set of precoding matrices generated through the restriction. As described supra, UE 120 can receive an indication from base station 110 to generate frequency-selective precoding matrices through the set restriction.

In one example the cubic metric may compare the cubic power of a signal with respect to a reference signal, the CM can be defined as in some telecommunication networks as:

$$CM = \frac{20\log_{10}(\text{rms}(\lfloor v_{norm}^3(t) \rfloor)) - 20\log_{10}(\lfloor vref_{norm}^3(t) \rfloor)}{K} dB,$$

where K is constant (and a real number) that is specific to the telecommunication system that enables wireless communication; $v_{norm}$ (t) is a normalized time-dependent signal and $vref_{norm}(t)$ is a normalized time-dependent reference signal, which is specific to the telecommunication system that enables wireless communication; the time-dependent signals are normalized through the root mean square thereof. It should be appreciated that other definitions of CM may be employed as a metric for PA performance in a radio component (e.g., radio component 412) in a mobile device (e.g., UE 120).

In an aspect, to implement such restriction, precoding matrix generator 404 limits the set of precoding matrices that can be selected over different frequency bands to a subset of a precoding codebook, such as 602a-e of FIG. 6 below. A mobile device, such as UE 120, can retain in memory (e.g., 424) an indication (e.g., a registers comprising a set of one or more bits) that determines a specific selection to be performed. The selection may be based at least on a received rank for one or more UL channels or other characteristics of radio link quality. In an example scenario, for four transmit antennas, e.g., QT=4, and rank 1 (r=1) transmission, precoding matrix generator 404 can restrict the set of precoding matrices (e.g., $W_0$-$W_4$) to the following set of four precoding matrices:

$$\left\{ \frac{1}{2}\begin{bmatrix} 1 \\ 1 \\ 1 \\ -1 \end{bmatrix}, \frac{1}{2}\begin{bmatrix} 1 \\ 1 \\ j \\ j \end{bmatrix}, \frac{1}{2}\begin{bmatrix} 1 \\ 1 \\ -1 \\ 1 \end{bmatrix}, \frac{1}{2}\begin{bmatrix} 1 \\ 1 \\ -j \\ -j \end{bmatrix} \right\}.$$

It may be appreciated that the foregoing set of precoding matrices is an example set and other sets are possible. As a result, transmit antenna 1 (e.g., antenna 1 in antenna(s) 518T) and transmit antenna 2 (e.g., antenna 2 in antenna(s) 518T) can transmit low-CM single-carrier waveform, and transmit antennas 3 and 4 can transmit, possibly, at higher CM. The parameter j in the precoding matrices satisfies $j^2=-1$.

In some examples, to accomplish MIMO telecommunication in UL with low-CM frequency-selective precoding, precoding matrix generator 404 can acquire a first precoding matrix over a frequency band (such as, $B_2$ 602b of FIG. 6 below) and can generate a second precoding matrix over the frequency band through a suitable phase rotation of each column of the first precoding matrix over the frequency band, where the second precoding matrix can enable one or more transmit antennas (e.g., group of antennas 518T) to transmit low-CM waveform in the UL in MIMO telecommunication mode. In an aspect, precoding matrix generator 404 can produce a set $\{W_i'\}$ of precoding matrices for a set of B frequency bands $\{b_i\}$ through rotation of an initial set $\{W_i\}$ of precoding matrices, where i=0, 1 ... B−1, with B a natural number equal to or greater than unity. Namely, a precoding matrix in the set $\{W_i'\}$ is determined by $W_i'=W_iR_i$ where $$R_i = \begin{bmatrix} e^{j\theta_{i,0}} & 0 & \cdots & 0 \\ 0 & e^{j\theta_{i,1}} & \cdots & \vdots \\ \vdots & \vdots & \ddots & 0 \\ 0 & \cdots & 0 & e^{j\theta_{i,r-1}} \end{bmatrix}$$

and r is a positive integer and at least one of the r values $\theta_{i,0}$, $\theta_{i,1}$ ... $\theta_{i,r-1}$ can be autonomously established, or configured, by precoding matrix generator 404, or one or more components therein, without notifying base station 110. The parameter j in $R_i$ satisfies $j^2=-1$. Values $\theta_{i,0}$, $\theta_{i,1}$ ... $\theta_{i,r-1}$ can be retained in memory 424, and can be defined statically (e.g., preconfigured or received over the air at a time UE 120 is provisioned) or can be defined dynamically (e.g., as a function of time, based on a schedule or an event). It should be appreciated that the demodulation reference signal (DM-RS) is to be precoded and channel estimation is to be performed on a per precoding frequency band basis. UE 120 can receive an indication, e.g., in configuration message, from base station 110 to generate frequency-selective precoding matrices through the phase rotation described supra.

In an example scenario, for four transmit antennas, e.g., QT=4, and rank 1 (r=1) transmission, precoding matrix generator 404 can acquire (e.g., select, select and retrieve, select and collect . . . ) the following set of five precoding matrices (e.g., $W_0$-$W_4$) for respective five frequency bands (e.g., $B_0$ 602a through $B_4$ 602e of FIG. 6 below):

$$\left\{ \frac{1}{2}\begin{bmatrix} 1 \\ 1 \\ 1 \\ -1 \end{bmatrix}, \frac{1}{2}\begin{bmatrix} 1 \\ -j \\ 1 \\ -j \end{bmatrix}, \frac{1}{2}\begin{bmatrix} 1 \\ -j \\ j \\ -1 \end{bmatrix}, \frac{1}{2}\begin{bmatrix} 1 \\ 1 \\ -j \\ -j \end{bmatrix}, \frac{1}{2}\begin{bmatrix} 1 \\ -1 \\ j \\ -j \end{bmatrix} \right\}.$$

It may be appreciated that the foregoing set of five precoding matrices is illustrative and other sets can be acquired. To enable low-CM transmission in UL for transmit antenna 2 (e.g., antenna 2 in antenna(s) 518T), precoding matrix generator 404 can rotate the precoding matrices in such set of five precoding matrices to generate the following set of precoding matrices:

$$\left\{ \frac{1}{2}\begin{bmatrix} 1 \\ 1 \\ 1 \\ -1 \end{bmatrix}*1, \frac{1}{2}\begin{bmatrix} 1 \\ -j \\ 1 \\ -j \end{bmatrix}*j, \frac{1}{2}\begin{bmatrix} 1 \\ -j \\ j \\ -1 \end{bmatrix}*j, \frac{1}{2}\begin{bmatrix} 1 \\ 1 \\ -j \\ -j \end{bmatrix}*1, \frac{1}{2}\begin{bmatrix} 1 \\ -1 \\ j \\ -j \end{bmatrix}*-1 \right\}.$$

As a result, the complex scaling term for antenna 2 becomes the same value in each of the precoding matrices. Therefore transmit antenna 2 can transmit low-CM single-carrier waveform, and antenna 1, antenna 3, and antenna 4 can transmit, possibly, at higher CM.

It may be possible with appropriate rotation to ensure that at least one of the antennas can transmit a low-CM single carrier waveform; e.g., with appropriate rotation one of the antennas may always transmit a low-CM single carrier waveform. In some cases, it may be possible to select rotation to ensure that more than one of the antennas can transmit low-CM single carrier waveforms. However, in order to ensure that such rotation can always be found, precoding matrix restriction, as previously described, may still be necessary. In additional or alternative embodiments, the phase rotation described supra can be implemented in combination with precoding matrix restriction describe hereinbefore to achieve low-CM transmission in the UL. For example, the precoding matrix generator 404 can implement such combination. UE 120 can receive an indication, e.g., in configuration message, from base station 110 to generate frequency-selective precoding matrices through the phase rotation described supra.

The base station 110 may configure a mode for generation of frequency-selective precoding matrices as described herein. In an aspect configuration component 448 may deliver to UE 120 an indication (e.g., a bitmap of one or more bits) of a precoding matrix generation mode, where the indication establishes a specific manner to determine (e.g., select) a set of precoding matrices over a group of frequency bands (e.g., 602a-e of FIG. 6 explained below) in accordance with aspects of the subject disclosure.

Figure 6:
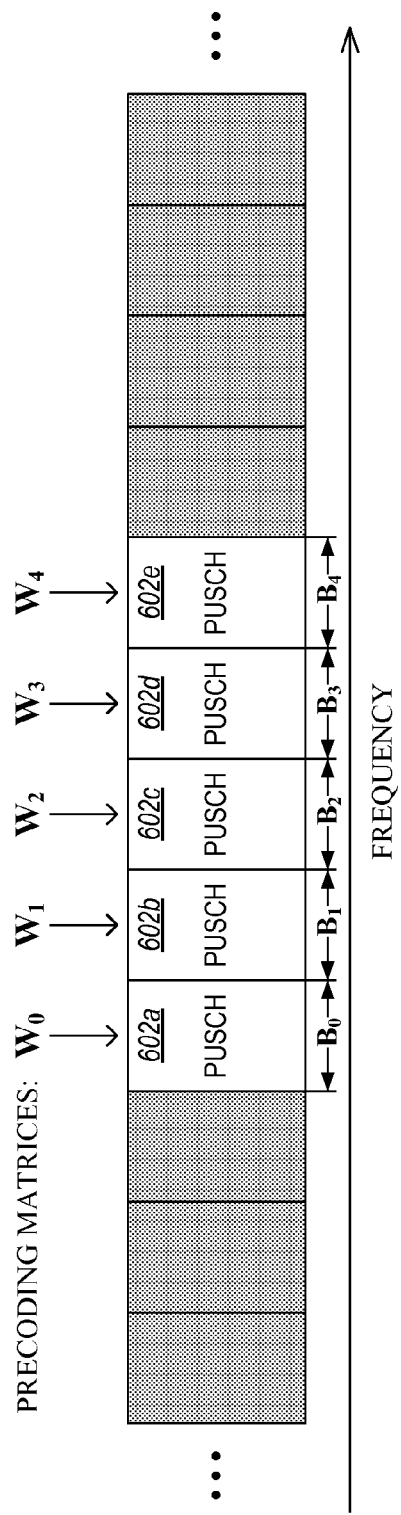
FIG. 6 illustrates a block diagram of frequency bands and respective precoding matrices.

FIG. 6 is a block diagram of a set of frequency bands $B_o$ 602a, $B_1$ 602b, $B_2$ 602c, $B_3$ 602d, and $B_4$ 602e, and respective precoding matrices $W_o$, $W_1$, $W_2$, $W_3$, and $W_4$ in accordance with aspects of the subject disclosure. In the example of clustered SC-FDMA signals, the frequency bands need not be consecutive.

Figure 7:
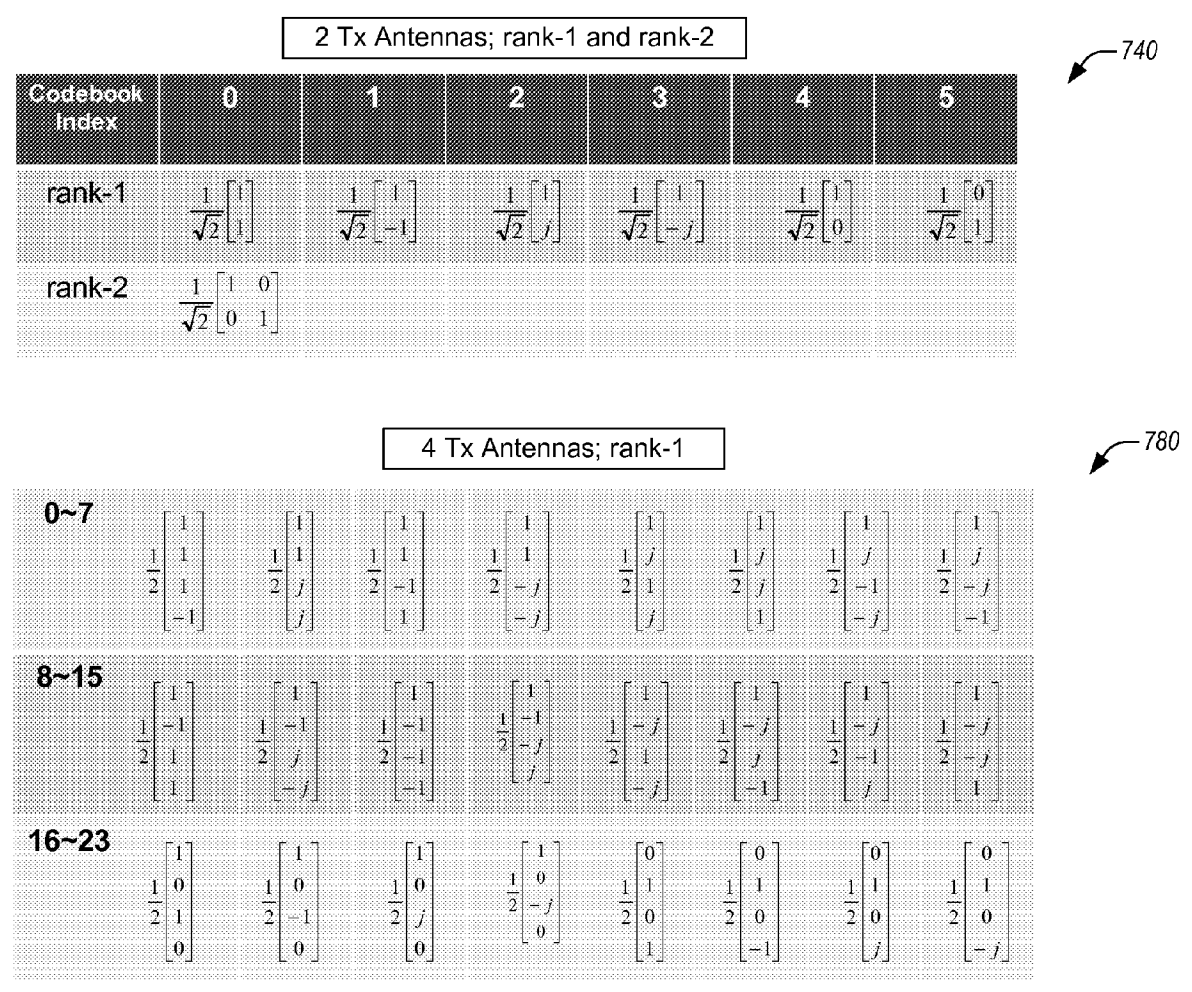

FIG. 7 illustrates exemplary groups of precoding matrices, or precoding codebooks, for an LTE network, where the precoding codebooks can be utilized to generate frequency-selective precoding matrices in accordance with aspects described herein. Diagram 740 presents precoding codebooks for two transmit antennas (e.g., antennas that are part of radio component 412) for rank 1 (r=1) and rank 2 (r=2) communication. Similarly, diagram 780 presents a precoding codebook for four transmit antennas (e.g., antennas that are part of radio component 412) for rank 1 (r=1) communication; precoding codebooks (not shown) are also available for rank 2 (r=2), rank 3 (r=3), and rank 4 (r=4) communication. Aspect or features of the subject disclosure are not limited to the illustrated, example precoding codebooks; such aspects of features also can be applied to any or substantially any precoding codebooks suitable for communication with a specific rank.

FIG. 8 is a flow chart of a wireless communication methodology 800. At box 802, a first set of precoding matrices for a set of frequency bands (e.g., $B_o$ 602a through $B_4$ 602e) is acquired (e.g., selected, determined, retrieved, requested, etc.). In one or more embodiments, acquiring the first set of precoding matrices includes selecting the first set of precoding matrices and retrieving, or collecting, such first set from a memory (e.g., 424); the selecting can be based on an indication of a communication rank received from a base station and/or an indication of a space of precoding matrices that are to be utilized for acquisition. In one example, the precoding matrix generator 404 can implement box 802.

At box 804, a second set of precoding matrices for the set of frequency bands is generated based on the first set of precoding matrices, wherein the second set of precoding matrices enables a transmission that satisfies a cubic metric criterion in MIMO communication mode in UL. In one example the cubic metric criteria may be satisfied when the transmission comprises a low cubic metric transmission. In another example, the cubic metric criteria may be satisfied when the cubic metric for a transmitted waveform of at least one transmit antenna is substantially minimized and/or the transmitted waveform of at least one transmit antenna maintains a single carrier waveform. The at least one transmit antenna for which the cubic metric is substantially minimized may be characterized as a low power antenna or an antenna operating in a low power mode. As previously discussed in regards to FIG. 5 above, in one example the second set of precoding matrices may include one or more of:

$$\frac{1}{2}\begin{bmatrix}1\\1\\1\\-1\end{bmatrix}, \frac{1}{2}\begin{bmatrix}1\\1\\j\\j\end{bmatrix}, \frac{1}{2}\begin{bmatrix}1\\1\\-1\\1\end{bmatrix}, \text{or } \frac{1}{2}\begin{bmatrix}1\\1\\-j\\-j\end{bmatrix},$$

where the first row of each matrix corresponds to the at least one transmit antenna for which the cubic metric is substantially minimized. Each of the second set of precoding matrices may be assigned to one of the frequency bands. In one example, at least one of the frequency bands may be assigned a different precoding matrix than at least one other of the frequency bands.

In an aspect, generating the second set of precoding matrices for the set of frequency bands may include restricting the first set of precoding matrices to a non-empty subset thereof, as described supra; in an embodiment, precoding matrix generator 404 or a processor that provides at least part of the functionality of the precoding matrix generator 404 can implement the restricting operation. In another aspect, generating the second set of precoding matrices for the set of frequency bands may include rotating a non-empty subset of the first set of precoding matrices; in certain embodiments, precoding matrix generator 404, or a processor that provides at least part of the described functionality of the precoding matrix generator 404, can implement the rotating operation. In one example, the rotating operation may be performed by multiplying each column of each precoding matrix of the non-empty subset of the first set of precoding matrices by a scalar. The scalars multiplied by each column may be distinct or may be substantially the same. In yet another aspect, generating the second set of precoding matrices for the set of frequency bands may include rotating a set of precoding matrices obtained from restricting the first set of precoding matrices.

In an example where the uplink spatial multiplexing is enabled, (i.e. rank>1), the second set of precoding matrices may be generated such that the precoding matrix values corresponding to a given transmit antenna are either all zero values, or are all non-zero values for each layer of a given frequency.

FIG. 9 is a block diagram of a portion of a wireless communication apparatus 900. The module 902 is provided for acquiring a first set of precoding matrices for a set of frequency bands (e.g., $B_0$ 602a through $B_4$ 602e). In one or more embodiments, acquiring the first set of precoding matrices includes selecting the first set of precoding matrices and retrieving, or collecting, such first set from a memory (e.g., 424); the selecting can be based on an indication of a communication rank received from a base station and/or an indication of a space of precoding matrices that are to be utilized for acquisition.

Module 904 is provided for generating a second set of precoding matrices for the set of frequency bands based on the first set of precoding matrices, wherein the second set of precoding matrices enables a transmission that satisfies a cubic metric criterion, such as a low-CM transmission in MIMO mode for UL. In an aspect, generating the second set of precoding matrices for the set of frequency bands may include restricting the first set of precoding matrices to a non-empty subset thereof, as described supra. In another aspect, generating the second set of precoding matrices for the set of frequency bands may include rotating a non-empty subset of the first set of precoding matrices. In yet another aspect, generating the second set of precoding matrices for the set of frequency bands may include rotating a set of precoding matrices obtained from restricting the first set of precoding matrices.

Figure 10:
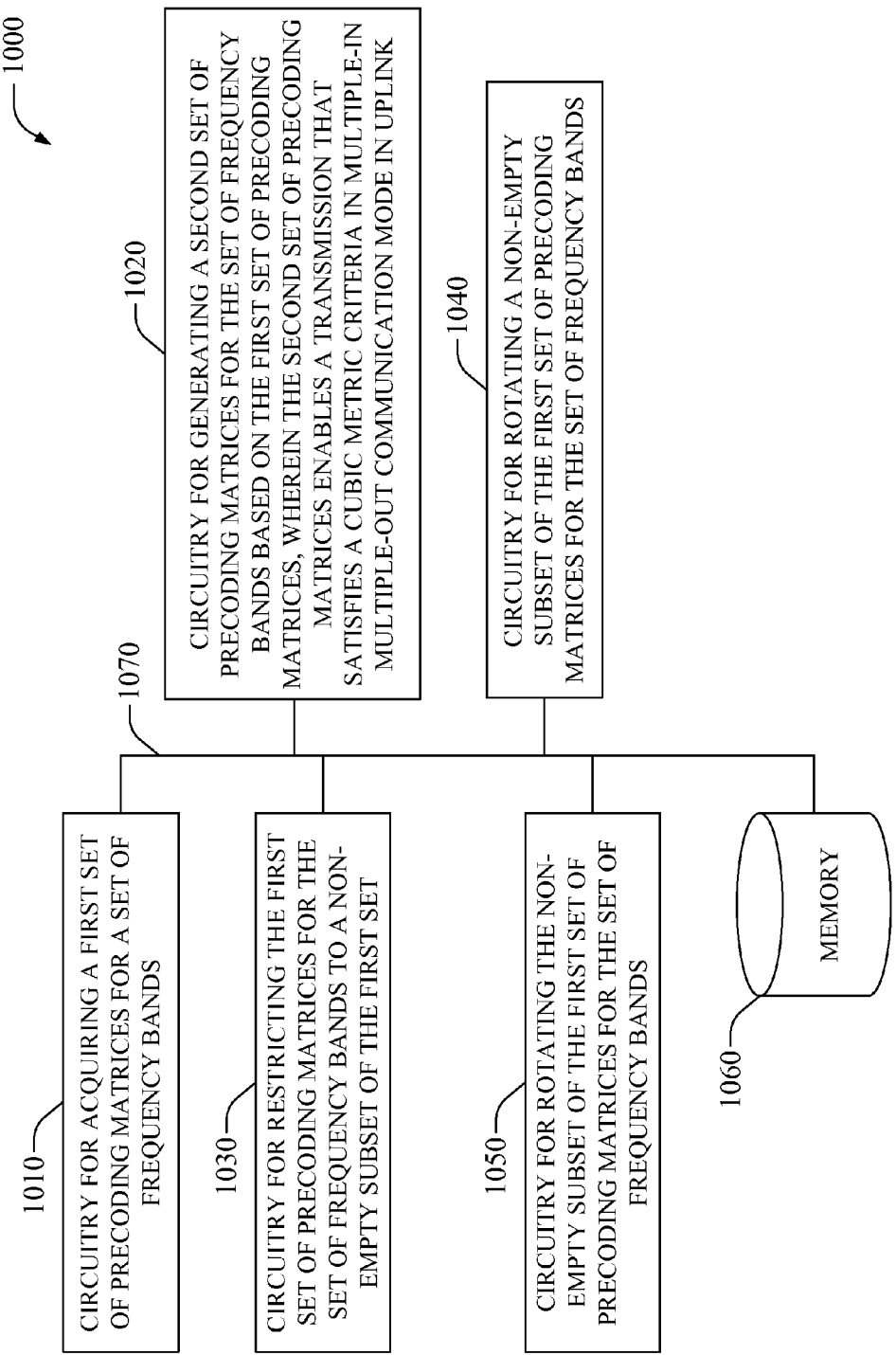
FIG. 10 is a block diagram of circuitry that facilitates generating a set of precoding matrices that enables transmissions that satisfy a cubic metric criterion.

FIG. 10 is a block diagram of an exemplary system 1000 that enables various aspects of the subject disclosure in connection with a transmission in the UL in MIMO mode that satisfies a cubic metric criterion. The subject example system 1000 can be part of a UE (e.g., UE 120). System 1000 includes electronic circuitry (also referred to as circuitry) 1010 for acquiring a first set of precoding matrices for a set of frequency bands. In addition, example system 1000 includes circuitry 1020 for generating a second set of precoding matrices for the set of frequency bands based on the first set of precoding matrices, wherein the second set of precoding matrices enables a transmission that satisfies a cubic metric criterion, such as a low cubic metric transmission. System 1000 may also include circuitry 1030 for restricting the first set of precoding matrices to a non-empty subset thereof.

Moreover, system 1000 may include circuitry 1040 for rotating a non-empty subset of the first set of precoding matrices. Furthermore, system 1000 may include circuitry 1050 for rotating the non-empty subset of the first set of precoding matrices.

The system 1000 also includes a memory 1060 that can store one or more sets of code instructions that, when executed by at least one processor (not shown), which can be part of the described circuitry, implement or enable the various aspects or features described herein in connection with messaging in distributed and iterative coordinated scheduling. In certain embodiments, the at least one processor (not shown) that executes the one or more sets of code instructions can be a centralized functional element external to the various circuitry that is part of example system 1000.

Interface 1070 enables exchange of data (e.g., code instructions, data structures, parameters . . . ) amongst the various circuitry, or circuitry blocks, of system 1000. To at least such end, the interface 1070 can include various architectures such as memory bus(es), address bus(es), message bus(es), wired and wireless links, or the like. Additional or alternative embodiments of system(s) that can enable and exploit various aspects of the subject disclosure in connection with transmissions that satisfy a cubic metric criterion in UL in MIMO mode can be obtained through various combinations of circuitry and electrical component blocks in exemplary system 1000.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean serving as an example, instance, or illustration. Any aspect or design described herein as "exemplary" is not necessarily to be construed as preferred or advantageous over other aspects or designs.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein (e.g., identifiers, assigners, transmitters and allocators), may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope consistent with the principles and novel features disclosed herein.

In view of the exemplary systems described supra, methods that may be implemented in accordance with the disclosed subject matter have been described with reference to several flow diagrams. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. Additionally, it should be further appreciated that the methods disclosed herein are capable of being stored on an article of manufacture to facilitate transporting and transferring such methods to computers. The term article of manufacture, as used herein, is intended to encompass a computer program accessible from any computer-readable device, carrier, or media.

What is claimed is:

1. A method for wireless communications, comprising:
receiving a configuration indication from a base station;
acquiring a first set of precoding matrices for a set of frequency bands based on the configuration indication from the base station; and generating a second set of precoding matrices for the set of frequency bands based on the first set of precoding matrices, wherein the second set of precoding matrices enables a transmission that satisfies a cubic metric criteria in multiple-in multiple-out communication mode in uplink.

2. The method of claim 1, wherein the generating the second set of precoding matrices for the set of frequency bands includes restricting the first set of precoding matrices to a non-empty subset thereof.

3. The method of claim 2, wherein the generating the second set of precoding matrices for the set of frequency bands further includes rotating the non-empty subset of the first set of precoding matrices.

4. The method of claim 1, wherein the generating the second set of precoding matrices for the set of frequency bands includes rotating a non-empty subset of the first set of precoding matrices.

5. The method of claim 4, wherein the rotating the non-empty subset of the first set of precoding matrices includes multiplying each column of each precoding matrix of the non-empty subset of the first set of precoding matrices by a scalar.

6. The method of claim 5, wherein a first scalar multiplied by at least one column of at least one precoding matrix of the non-empty subset of the first set of precoding matrices differs from a second scalar multiplied by at least one column of at least one precoding matrix of the non-empty subset of the first set of precoding matrices.

7. The method of claim 1, further including assigning a precoding matrix of the second set of precoding matrices to each frequency band of the set of frequency bands.

8. The method of claim 7, wherein at least one of the frequency bands of the set of frequency bands is assigned a different precoding matrix than at least one other frequency bands of the set of frequency bands.

9. The method of claim 1, wherein the second set of precoding matrices includes at least one of:

$$\frac{1}{2}\begin{bmatrix}1\\1\\1\\-1\end{bmatrix}, \frac{1}{2}\begin{bmatrix}1\\1\\j\\j\end{bmatrix}, \frac{1}{2}\begin{bmatrix}1\\1\\-1\\1\end{bmatrix}, \text{ or } \frac{1}{2}\begin{bmatrix}1\\1\\-j\\-j\end{bmatrix}.$$

10. The method of claim 1, wherein the cubic metric criteria is satisfied when the transmission comprises a low cubic metric transmission.

11. The method of claim 10, wherein the second set of precoding matrices is generated for the set of frequency bands such that a cubic metric for a transmitted waveform of at least one transmit antenna is substantially minimized.

12. The method of claim 11, wherein the at least one transmit antenna is characterized as a low power antenna or an antenna operating in a low power mode.

13. The method of claim 12, wherein the at least one transmit antenna is associated with a first row of the precoding matrices of the second set of precoding matrices.

14. The method of claim 10, wherein the second set of precoding matrices is generated for the set of frequency bands such that a transmitted waveform of at least one transmit antenna maintains a single carrier waveform.

15. A communications apparatus, comprising:
means for receiving a configuration indication from a base station;
means for acquiring a first set of precoding matrices for a set of frequency bands based on the configuration indication from the base station; and
means for generating a second set of precoding matrices for the set of frequency bands based on the first set of precoding matrices, wherein the second set of precoding matrices enables a transmission that satisfies a cubic metric criteria in multiple-in multiple-out communication mode in uplink.

16. The communications apparatus of claim 15 further including means for restricting the first set of precoding matrices to a non-empty subset thereof.

17. The communications apparatus of claim 16, further including means for rotating the non-empty subset of the first set of precoding matrices.

18. The communications apparatus of claim 15, further including means for rotating a non-empty subset of the first set of precoding matrices.

19. The communications apparatus of claim 18, wherein the means for rotating the non-empty subset of the first set of precoding matrices further includes means for multiplying each column of each precoding matrix of the non-empty subset of the first set of precoding matrices by a scalar.

20. The communications apparatus of claim 19, wherein a first scalar multiplied by at least one column of at least one precoding matrix of the non-empty subset of the first set of precoding matrices differs from a second scalar multiplied by at least one column of at least one precoding matrix of the non-empty subset of the first set of precoding matrices.

21. The communications apparatus of claim 15, further including means for assigning a precoding matrix of the second set of precoding matrices to each frequency band of the set of frequency bands.

22. The communications apparatus of claim 21, wherein at least one of the frequency bands of the set of frequency bands is assigned a different precoding matrix than at least one other frequency bands of the set of frequency bands.

23. The communications apparatus of claim 15, wherein the second set of precoding matrices includes at least one of:

$$\frac{1}{2}\begin{bmatrix}1\\1\\1\\-1\end{bmatrix}, \frac{1}{2}\begin{bmatrix}1\\1\\j\\j\end{bmatrix}, \frac{1}{2}\begin{bmatrix}1\\1\\-1\\1\end{bmatrix}, \text{ or } \frac{1}{2}\begin{bmatrix}1\\1\\-j\\-j\end{bmatrix}.$$

24. The communications apparatus of claim 15, wherein the cubic metric criteria is satisfied when the transmission comprises a low cubic metric transmission.

25. The communications apparatus of claim 24, wherein the second set of precoding matrices is generated for the set of frequency bands such that a cubic metric for a transmitted waveform of at least one transmit antenna is substantially minimized.

26. The communications apparatus of claim 25, wherein the at least one transmit antenna is characterized as a low power antenna or an antenna operating in a low power mode.

27. The communications apparatus of claim 26, wherein the at least one transmit antenna is associated with a first row of the precoding matrices of the second set of precoding matrices.

28. The communications apparatus of claim 24, wherein the second set of precoding matrices is generated for the set of frequency bands such that a transmitted waveform of at least one transmit antenna maintains a single carrier waveform.

29. A non-transitory computer program product comprising a computer-readable storage medium, the computer-readable storage medium comprising:
  instructions for causing at least one processor to receive a configuration indication from a base station;
  instructions for causing at least one processor to acquire a first set of precoding matrices for a set of frequency bands based on the configuration indication from the base station; and
  instructions for causing the at least one processor to generate a second set of precoding matrices for the set of frequency bands based on the first set of precoding matrices, wherein the second set of precoding matrices enables a transmission that satisfies a cubic metric criteria in multiple-in multiple-out communication mode in uplink.

30. The non-transitory computer program product of claim 29, wherein the computer-readable storage medium further includes instructions for causing the at least one processor to restrict the first set of precoding matrices to a non-empty subset thereof.

31. The non-transitory computer program product of claim 30, wherein the computer-readable storage medium further includes instructions for causing the at least one processor to rotate the non-empty subset of the first set of precoding matrices.

32. The non-transitory computer program product of claim 29, wherein the computer-readable storage medium further includes instructions for causing the at least one processor to rotate a non-empty subset of the first set of precoding matrices.

33. The non-transitory computer program product of claim 32, wherein the instructions for causing the at least one processor to rotate the non-empty subset of the first set of precoding matrices further includes instructions for causing the at least one processor to multiply each column of each precoding matrix of the non-empty subset of the first set of precoding matrices by a scalar.

34. The non-transitory computer program product of claim 33, wherein a first scalar multiplied by at least one column of at least one precoding matrix of the non-empty subset of the first set of precoding matrices differs from a second scalar multiplied by at least one column of at least one precoding matrix of the non-empty subset of the first set of precoding matrices.

35. The non-transitory computer program product of claim 29, wherein the cubic metric criteria is satisfied when the transmission comprises a low cubic metric transmission.

36. The non-transitory computer program product of claim 35, wherein the second set of precoding matrices is generated for the set of frequency bands such that a cubic metric for a transmitted waveform of at least one transmit antenna is substantially minimized.

37. The non-transitory computer program product of claim 36, wherein the at least one transmit antenna is characterized as a low power antenna or an antenna operating in a low power mode.

38. The non-transitory computer program product of claim 37, wherein the at least one transmit antenna is associated with a first row of the precoding matrices of the second set of precoding matrices.

39. The non-transitory computer program product of claim 35, wherein the second set of precoding matrices is generated for the set of frequency bands such that a transmitted waveform of at least one transmit antenna maintains a single carrier waveform.

40. An apparatus for wireless communication, comprising:
  at least one processor configured to receive a configuration indication from a base station, acquire a first set of precoding matrices for a set of frequency bands based on the configuration indication from the base station, and generate a second set of precoding matrices for the set of frequency bands based on the first set of precoding matrices, wherein the second set of precoding matrices enables a transmission that satisfies a cubic metric criteria in multiple-in multiple-out communication mode in uplink.

41. The apparatus of claim 40, wherein the at least one processor is further configured to restrict the first set of precoding matrices to a non-empty subset thereof.

42. The apparatus of claim 41, wherein the at least one processor is further configured to rotate the non-empty subset of the first set of precoding matrices.

43. The apparatus of claim 40, wherein the at least one processor is further configured to rotate a non-empty subset of the first set of precoding matrices.

44. The apparatus of claim 43, wherein the at least one processor is further configured to multiply each column of each precoding matrix of the non-empty subset of the first set of precoding matrices by a scalar.

45. The apparatus of claim 44, wherein a first scalar multiplied by at least one column of at least one precoding matrix of the non-empty subset of the first set of precoding matrices differs from a second scalar multiplied by at least one column of at least one precoding matrix of the non-empty subset of the first set of precoding matrices.

46. The apparatus of claim 40, wherein the cubic metric criteria is satisfied when the transmission comprises a low cubic metric transmission.

47. The apparatus of claim 46, wherein the second set of precoding matrices is generated for the set of frequency bands such that a cubic metric for a transmitted waveform of at least one transmit antenna is substantially minimized.

48. The apparatus of claim 47, wherein the at least one transmit antenna is characterized as a low power antenna or an antenna operating in a low power mode.

49. The apparatus of claim 48, wherein the at least one transmit antenna is associated with a first row of the precoding matrices of the second set of precoding matrices.

50. The apparatus of claim 46, wherein the second set of precoding matrices is generated for the set of frequency bands such that a transmitted waveform of at least one transmit antenna maintains a single carrier waveform.

* * * * *